(12) United States Patent
Marton et al.

(10) Patent No.: US 8,819,215 B2
(45) Date of Patent: Aug. 26, 2014

(54) SYSTEM, METHODS, APPARATUSES AND COMPUTER PROGRAM PRODUCTS FOR PROVIDING STEP-AHEAD COMPUTING

(75) Inventors: Gabor Marton, Budapest (HU); Jyrki Akkanen, Espoo (FI)

(73) Assignee: Nokia Corporation, Espoo (FI)

( * ) Notice: Subject to any disclaimer, the term of this patent is extended or adjusted under 35 U.S.C. 154(b) by 1466 days.

(21) Appl. No.: 11/668,089

(22) Filed: Jan. 29, 2007

(65) Prior Publication Data
US 2008/0183801 A1 Jul. 31, 2008

(51) Int. Cl.
G06F 15/173 (2006.01)
G06F 11/34 (2006.01)
H04L 29/08 (2006.01)

(52) U.S. Cl.
CPC ............ *G06F 11/34* (2013.01); *G06F 11/3442* (2013.01); *G06F 11/3447* (2013.01); *G06F 11/3452* (2013.01); *H04L 67/1008* (2013.01)
USPC .......................................... 709/224; 709/232

(58) Field of Classification Search
USPC .......................................... 709/205; 715/810
See application file for complete search history.

(56) References Cited

U.S. PATENT DOCUMENTS

| | | | | |
|---|---|---|---|---|
| 5,727,129 | A * | 3/1998 | Barrett et al. | 706/10 |
| 5,758,087 | A * | 5/1998 | Aaker et al. | 709/232 |
| 5,835,087 | A * | 11/1998 | Herz et al. | 715/810 |
| 5,963,671 | A * | 10/1999 | Comerford et al. | 382/230 |
| 6,055,569 | A * | 4/2000 | O'Brien et al. | 709/223 |
| 6,154,767 | A * | 11/2000 | Altschuler et al. | 709/203 |
| 6,323,884 | B1 * | 11/2001 | Bird et al. | 715/810 |
| 6,324,177 | B1 * | 11/2001 | Howes et al. | 370/389 |
| 6,327,677 | B1 * | 12/2001 | Garg et al. | 714/37 |
| 6,353,444 | B1 * | 3/2002 | Katta et al. | 715/716 |
| 6,393,480 | B1 * | 5/2002 | Qin et al. | 709/224 |
| 6,400,996 | B1 * | 6/2002 | Hoffberg et al. | 700/83 |
| 6,415,317 | B1 * | 7/2002 | Yelon et al. | 709/205 |

(Continued)

FOREIGN PATENT DOCUMENTS

| | | |
|---|---|---|
| JP | 2003 323402 | 11/2003 |
| JP | 2005 228227 | 8/2005 |
| WO | WO 03/017094 | 2/2003 |

*Primary Examiner* — B. Tiv
(74) *Attorney, Agent, or Firm* — Ditthavong & Steiner, P.C.

(57) ABSTRACT

A system for providing step-ahead computing may include a client and a server. The client may include a communication element, a user interface element and a processor. The communication element may be configured to receive a set of pre-computed actions. The set of pre-computed actions may be based on at least one possible future state of the client. The user interface element may be configured to receive a user input corresponding to a particular action. The processor may be in communication with the communication element and the user interface element. The processor may be configured to determine whether the set of pre-computed actions include an action corresponding to the particular action and to execute the action in response to a determination that the set of pre-computed actions include the action corresponding to the particular action. The server may include a processing element, a pre-computing element and a server side communication element. The processing element may be configured to receive an indication of a current state of the client. The pre-computing element may be in communication with the processing element and configured to determine the set of pre-computed actions based on the at least one possible future state of the client. The server side communication element may be in communication with the processing element and configured to communicate the pre-computed actions to the client.

35 Claims, 11 Drawing Sheets

(56) References Cited

U.S. PATENT DOCUMENTS

| | | | |
|---|---|---|---|
| 7,170,993 B2 * | 1/2007 | Anderson et al. | 379/265.09 |
| 7,203,746 B1 * | 4/2007 | Harrop | 709/224 |
| 7,287,086 B2 * | 10/2007 | Krissell | 709/232 |
| 7,415,453 B2 * | 8/2008 | Suzuki et al. | 1/1 |
| 7,565,441 B2 * | 7/2009 | Romanik et al. | 709/234 |
| 7,650,319 B2 * | 1/2010 | Hoffberg et al. | 706/45 |
| 7,721,061 B1 * | 5/2010 | Kelly et al. | 711/167 |
| 2002/0015042 A1 * | 2/2002 | Robotham et al. | 345/581 |
| 2002/0078136 A1 * | 6/2002 | Brodsky et al. | 709/203 |
| 2002/0133382 A1 * | 9/2002 | DeMarcken et al. | 705/5 |
| 2004/0210899 A1 * | 10/2004 | Somogyi | 718/100 |
| 2005/0071777 A1 * | 3/2005 | Roessler et al. | 715/810 |
| 2006/0053219 A1 * | 3/2006 | Kutsumi et al. | 709/224 |
| 2006/0200456 A1 * | 9/2006 | Zohar et al. | 707/4 |
| 2007/0038372 A1 * | 2/2007 | Kudo et al. | 701/211 |
| 2007/0094325 A1 * | 4/2007 | Ih et al. | 709/203 |
| 2007/0107012 A1 * | 5/2007 | Rachamadugu | 725/34 |
| 2007/0192736 A1 * | 8/2007 | Lee et al. | 715/810 |
| 2007/0233866 A1 * | 10/2007 | Appleby et al. | 709/226 |
| 2008/0134182 A1 * | 6/2008 | Somogyi | 718/100 |
| 2008/0163112 A1 * | 7/2008 | Lee et al. | 715/810 |
| 2008/0167016 A1 * | 7/2008 | Swanburg et al. | 455/414.1 |
| 2008/0183801 A1 * | 7/2008 | Marton et al. | 709/203 |
| 2009/0125510 A1 * | 5/2009 | Graham et al. | 707/5 |
| 2009/0157870 A1 * | 6/2009 | Nakadai | 709/224 |

* cited by examiner

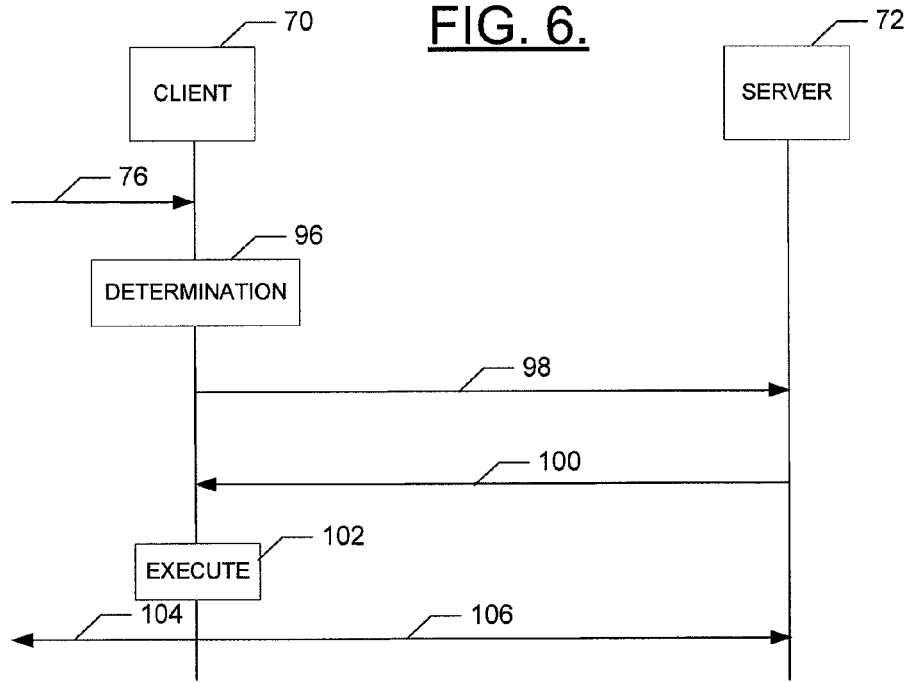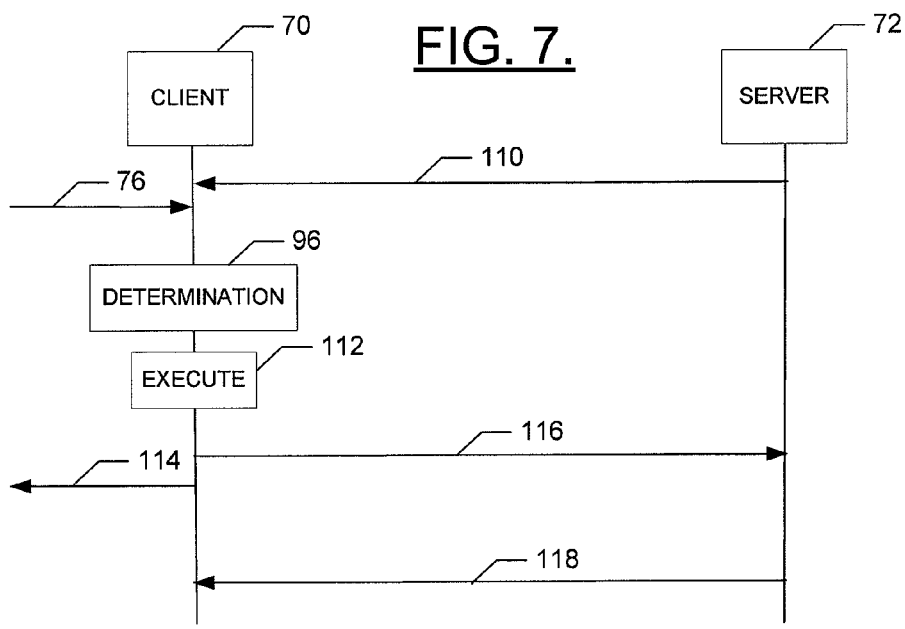

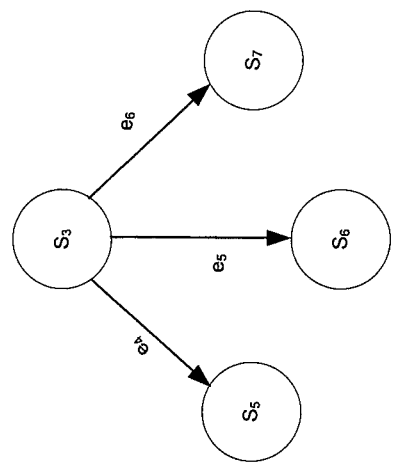
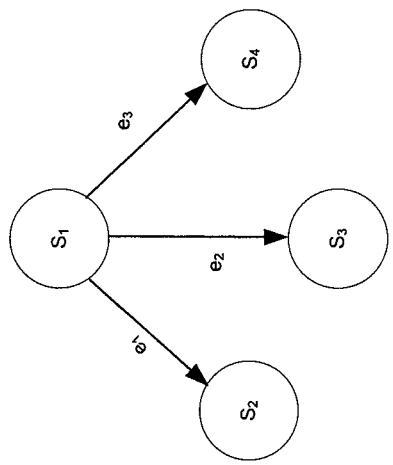
FIG. 10.

SYSTEM, METHODS, APPARATUSES AND COMPUTER PROGRAM PRODUCTS FOR PROVIDING STEP-AHEAD COMPUTING

TECHNOLOGICAL FIELD

Embodiments of the present invention relate generally to client-server communication technology and, more particularly, relate to a system, methods, apparatuses and computer program products for reducing latency in a client-server communication environment.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, etc. The services may also be in the form of interactive applications in which the user may communicate with a network device in order to perform a task or achieve a goal. The services may be provided from a network server or other network device, or even from the mobile terminal such as, for example, a mobile telephone, a mobile television, a mobile gaming system, a mobile computer, etc.

For many services in which provision of the service involves a two way communication of data between devices or applications, latency may be experienced as a time delay between the moment a data item is selected, for example, at a client device, and the moment that the selected data item is received at a server device. Finite channel capacity (e.g., bandwidth, data rate, etc.) of the communication link between the client and server devices may also limit responsiveness of data transfer between the client and server devices. For example, the channel capacity limits the amount of information that may be transmitted over a given time. As such, channel capacity limitations may also lead to latency.

Latency in data communication may provide a negative impact to user experience. For example, if a response to a user action is delayed for a noticeable period of time (e.g., greater than one second), the responsiveness of an application may be perceived as being degraded and the user may be disturbed by the delay. The effects of latency may be further compounded if the server device must fetch information from other servers in order to meet a client request. Given that composite web services and service mash-ups are becoming more common, the delays described above may become more problematic.

Efforts have been expended in order to reduce latency in client-server environments, but such efforts have often focused on shifting more resources to the client side. However, such a shift of resources may not always be possible or desirable. Accordingly, it may be advantageous to provide an improved client-server communication environment, which may overcome the disadvantages described above.

BRIEF SUMMARY

A system, methods, apparatuses and computer program products are therefore provided to enable client-server communication with reduced latency. In particular, a method, apparatus and computer program product are provided to enable a server to perform step-ahead computing and enable a client to utilize pre-computed actions received from the server. In this regard, the server may be configured to calculate pre-computed actions indicative of states to which the client may proceed for some or all possible user selections. The server may then communicate the pre-computed actions to the client to enable the client to perform actions for which a corresponding pre-computed action has been received without waiting for a server response to a user interface event as is typically required. Thus, for example, when a client receives a user input directing execution of a particular action, embodiments of the present invention may enable the client to utilize pre-computed action related information previously determined by the server in order to reduce latency experienced by the user. Accordingly, user experience may be enhanced and client-server communications for electronic devices such as mobile terminals may be improved.

In one exemplary embodiment, a method of providing step-ahead computing is provided. The method includes receiving an indication of a current state of a client, determining a set of pre-computed actions based on at least one possible future state of the client, and communicating the pre-computed actions to the client.

In another exemplary embodiment, a computer program product for providing step-ahead computing is provided. The computer program product includes at least one computer-readable storage medium having computer-readable program code portions stored therein. The computer-readable program code portions include first, second and third executable portions. The first executable portion is for receiving an indication of a current state of a client. The second executable portion is for determining a set of pre-computed actions based on at least one possible future state of the client. The third executable portion is for communicating the pre-computed actions to the client.

In another exemplary embodiment, an apparatus for providing step-ahead computing is provided. The apparatus may include a processing element, a pre-computed element and a communication element. The processing element may be configured to receive an indication of a current state of a client. The pre-computed element may be in communication with the processing element and configured to determine a set of pre-computed actions based on at least one possible future state of the client. The communication element may be in communication with the processing element and configured to communicate the pre-computed actions to the client.

In another exemplary embodiment, a method of providing step-ahead computing is provided. The method includes receiving, at a client, a set of pre-computed actions from a server. The set of pre-computed actions may be based on at least one possible future state of the client. The method further includes receiving a user input corresponding to a particular action, determining whether the set of pre-computed actions include an action corresponding to the particular action, and executing the action in response to a determination that the set of pre-computed actions include the action corresponding to the particular action.

In another exemplary embodiment, a computer program product for providing step-ahead computing is provided. The computer program product includes at least one computer-readable storage medium having computer-readable program code portions stored therein. The computer-readable program code portions include first, second, third and fourth executable portions. The first executable portion is for receiving, at a client, a set of pre-computed actions from a server. The set of pre-computed actions may be based on at least one possible future state of the client. The second executable portion is for receiving a user input corresponding to a particular action. The third executable portion is for determining whether the set of pre-computed actions include an action corresponding to the particular action. The fourth executable portion is for executing the action in response to a determination that the set of pre-computed actions include the action corresponding to the particular action.

In another exemplary embodiment, an apparatus for providing step-ahead computing is provided. The apparatus may include a communication element, a user interface element and a processing element. The communication element may be configured to receive, at a client, a set of pre-computed actions from a server. The set of pre-computed actions may be based on at least one possible future state of the client. The user interface element may be configured to receive a user input corresponding to a particular action. The processing element may be in communication with the communication element and the user interface element. The processing element may be configured to determine whether the set of pre-computed actions include an action corresponding to the particular action and execute the action in response to a determination that the set of pre-computed actions include the action corresponding to the particular action.

In another exemplary embodiment, a system for providing step-ahead computing is provided. The system may include a client and a server. The client may include a communication element, a user interface element and a processor. The communication element may be configured to receive a set of pre-computed actions. The set of pre-computed actions may be based on at least one possible future state of the client. The user interface element may be configured to receive a user input corresponding to a particular action. The processor may be in communication with the communication element and the user interface element. The processor may be configured to determine whether the set of pre-computed actions include an action corresponding to the particular action and to execute the action in response to a determination that the set of pre-computed actions include the action corresponding to the particular action. The server may include a processing element, a pre-computed element and a server side communication element. The processing element may be configured to receive an indication of a current state of the client. The pre-computed element may be in communication with the processing element and configured to determine the set of pre-computed actions based on the at least one possible future state of the client. The server side communication element may be in communication with the processing element and configured to communicate the pre-computed actions to the client.

Embodiments of the invention may provide a system, method, apparatus and computer program product for employment in systems to enhance client-server communications. As a result, for example, mobile terminals and other electronic devices may benefit from an ability to communicate with reduced latency experienced by users.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 6 is a control flow diagram of an event updating process in which a client has not received a pre-computed action corresponding to a user input according to an exemplary embodiment of the present invention;

FIG. 7 is a control flow diagram of an event updating process in which the client has received a pre-computed action corresponding to the user input according to an exemplary embodiment of the present invention;

FIG. 10 illustrates a diagram of server activity according to an exemplary embodiment of the present invention;

DETAILED DESCRIPTION

Figure 1:
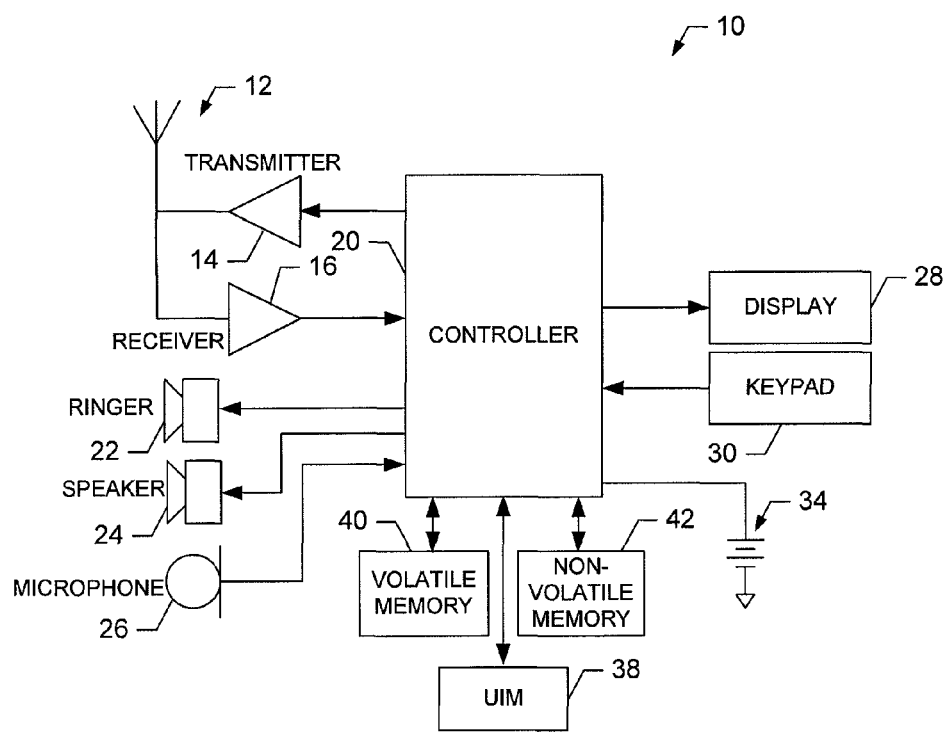
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, WCDMA and TD-SCDMA, with fourth-generation (4G) wireless communication protocols or the like.

It is understood that the controller 20 includes circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device.

In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
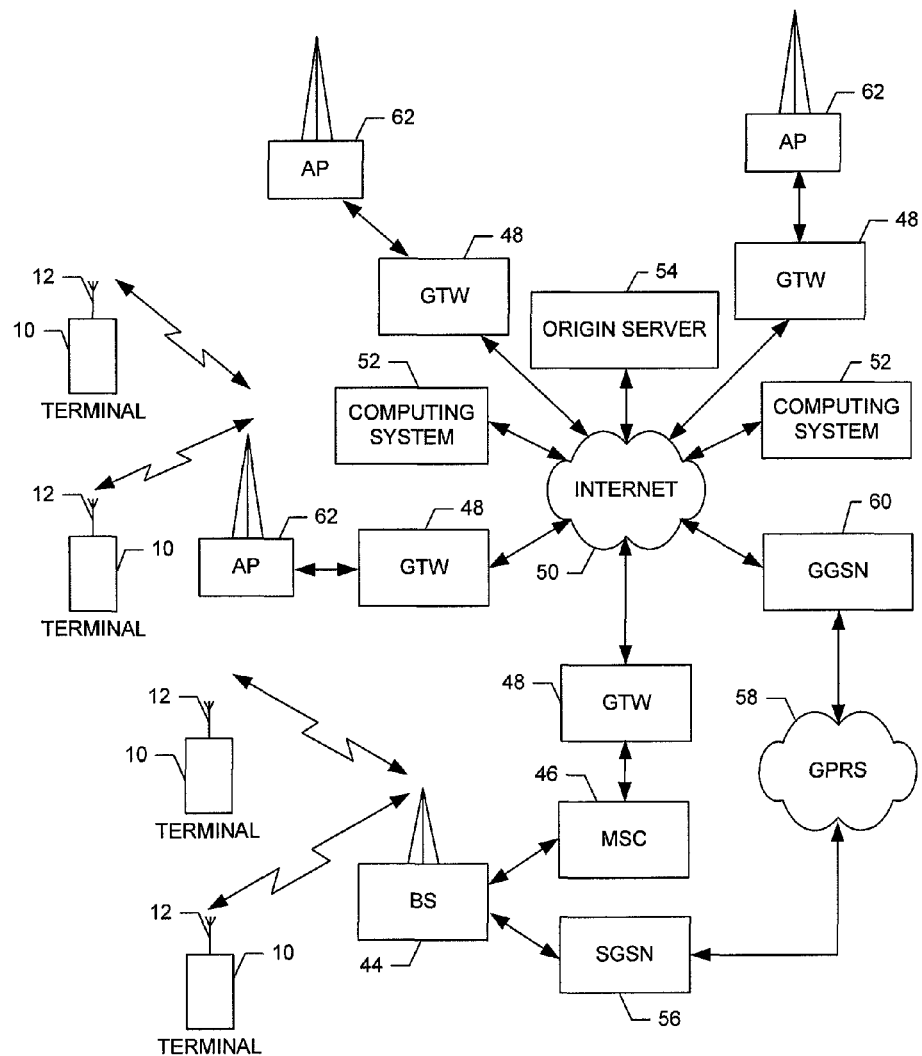
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a serving GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a gateway GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX, UWB techniques and/or the like.

In an exemplary embodiment, content or data may be communicated over the system of FIG. 2 between a mobile terminal (e.g., a client device), which may be similar to the mobile terminal 10 of FIG. 1 and a network device (e.g., a server device) of the system of FIG. 2, or between mobile terminals. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, and/or may be resident on a network device or other device accessible to the communication device.

Figure 3:
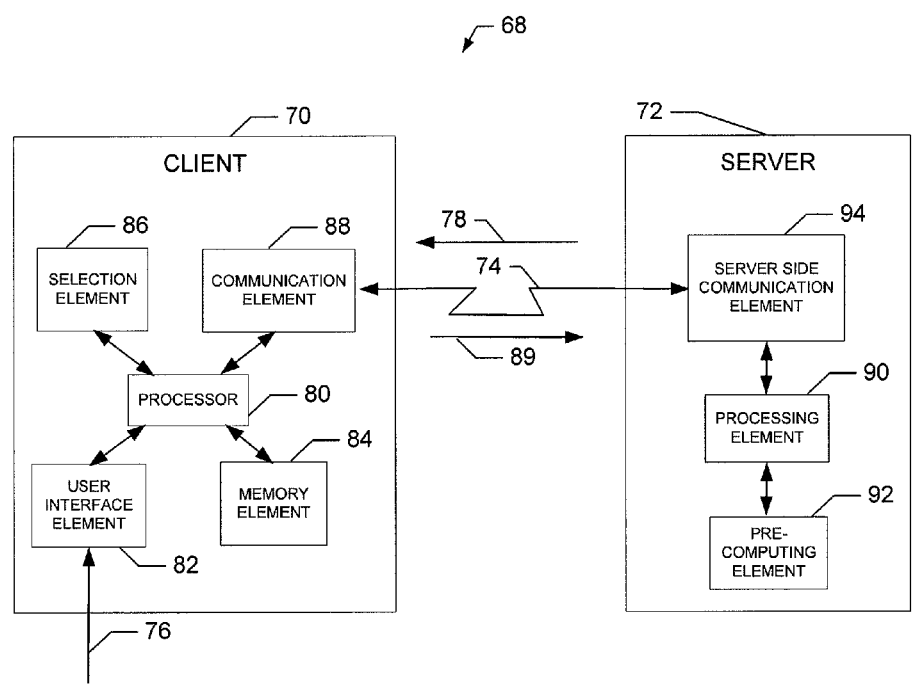
FIG. 3 illustrates a block diagram of a system for providing step-ahead computing according to an exemplary embodiment of the present invention.

FIG. 3 illustrates a block diagram of a system for providing step-ahead computing according to an exemplary embodiment of the present invention. Although the system could be a system similar to that shown in FIG. 2, the embodiment of FIG. 3 illustrates a simple configuration in which a client-server communication is described. An exemplary embodiment of the invention will now be described with reference to FIG. 3, in which certain elements of a system for providing step-ahead computing are displayed. The system of FIG. 3 will be described, for purposes of example, in connection with the mobile terminal 10 of FIG. 1 and a server device. However, it should be noted that the system of FIG. 3, may also be employed in connection with a variety of other devices, both mobile and fixed, and therefore, embodiments of the present invention should not be limited to application on devices such as the mobile terminal 10 of FIG. 1 or within any particular server device. It should also be noted, that while FIG. 3 illustrates one example of a configuration of a system for providing step-ahead computing, numerous other configurations may also be used to implement embodiments of the present invention.

Referring now to FIG. 3, a system 68 for providing content step-ahead computing is provided. The system 68 may include a client 70 and a server 72 in communication with each other via a communication link 74 which may be, for example, a wireless communication link such as any of those described above. The communication link 74 could be, for example, an asynchronous reliable channel over which, e.g., transmission control protocol (TCP), Blocks Extensible Exchange Protocol (BEEP) framework, etc. could be implemented. According to an exemplary embodiment, it may be assumed that the client 70 is operating an application, the execution of which involves client-server communication of data, content and/or messages regarding state information and/or event information. In this regard, the server 72 may be configured to perform step-ahead computing by, for example, pre-computing the corresponding effect of each possible future user input 76 received from a user of the client 70. The server 72 may be configured to communicate pre-computed actions 78 corresponding to each possible corresponding effect to the client 70 so that, in response to receipt of the user input 76 at the client 70, the client 70 may be enabled to execute the action corresponding to the user input 76 based on a corresponding pre-computed action without communicating the event associated with the user input 76 to the server 72 and waiting for an action in response from the server 72. It should be noted that although the term pre-computed is used herein to describe step-ahead computing, the term pre-computed should not be seen as being indicative of requiring a computation or calculation in a mathematical sense. Rather, the term pre-computed should be understood to denote that possible future actions (e.g., candidate actions) may be determined prior to receiving a client selection of an action.

In general, the client 70 and/or the server 72 may be any device or means embodied in either hardware, software, or a combination of hardware and software that is capable of performing client and/or server functions, respectively, as described herein. In this regard, the client 70 and the server 72 could each be similar to known client and server devices except that they employ additional elements as described herein to enable functioning responsive to step-ahead computing. It should be noted that the client 70 and/or the server 72 need not necessarily be an actual device. Instead, the client 70 and/or the server 72 may each be comprised of an application operating at a particular device. However, as described herein for purposes of example and not limitation, the client 70 and the server 72 will each be described in the context of a client device and a server device, respectively. Furthermore, it should be noted that a particular device could operate as a client in one context and a server in another context. In other words, for example, a particular network device could act as a server with respect to a client such as a network node. In response to a particular request from the network node, the particular network device may request content from another network device in order to fulfill the particular request. Accordingly, the particular network device may be a server with respect to the network node and a client with respect to the other network device. In either case, the particular network device may operate according to embodiments of the present invention. In short, the terms client and server are descriptive of function with respect to a particular communication context and not meant to be limiting.

In addition to other elements, the client 70 may include a processor 80 (e.g., the controller 20) or other processing element, a user interface element 82 and a memory element 84. The user interface element 82 may include, for example, a keyboard, keypad, function keys, mouse, scrolling device, touch screen, or any other mechanism by which a user may interface with the client 70, for example, to provide the user input 76 and/or provide an output to the user. The memory element 84 may include, for example, volatile or non-volatile memory. The memory element 84 may be configured to store information, data, applications, instructions or the like for enabling the client 70 to carry out various functions in accordance with exemplary embodiments of the present invention. For example, the memory element 84 could be configured to buffer the pre-computed actions 78 for processing by the processor 80. Additionally or alternatively, the memory element 84 could be configured to store other data. The processor 80 may control the operation of other client 70 elements such as a selection element 86 and/or a communication element 88 or may otherwise perform the functions of the selection element 86 and or the communication element 88 as described below.

The selection element 86 may be any device or means embodied in either hardware, software, or a combination of hardware and software, such as, for example, the processor 80, that is capable of determining whether one of the pre-computed actions 78 received from the server 72 corresponds to a user interface event associated with the user input 76. In response to the selection element 86 determining that a user interface event indicated via the user interface element 82 corresponds to one of the pre-computed actions 78 stored in the memory element 84, the selection element 86 may inform the processor 80 that an action associated with the user interface event corresponds to one of the stored pre-computed actions 78. The processor 80 may then be enabled to execute the action associated with the corresponding one of the pre-computed actions 78 without performing a conventional client-server communication. In other words, the selection element 86 may be configured to determine, for each user interface event received, whether the client 70 has already received a pre-computed action thereby enabling the client 70 (e.g., the processor 80) to perform the action associated with the user interface event or whether the client device 70 should access data associated with performance of the action from the server 72 (e.g., if no pre-computed action corresponds to the action associated with the user interface event). It should be noted that although the selection element 86 may examine the pre-computed actions 78 stored in the memory element 84, in an exemplary embodiment, the selection element 86 may examine pre-computed actions as they are received from the server 72 so that the pre-computed actions 78 need not necessarily be stored at the client 70.

The communication element 88 may be any device or means embodied in either hardware, software, or a combination of hardware and software, such as a transceiver or other communications interface, that is capable of conducting communications with the server 72, for example, via the communication link 74. In an exemplary embodiment, the communication element 88 may be configured to receive the pre-computed actions 78 from the server 72 and/or communicate a notification 89 to the server 72 in response to the execution of an action responsive to receipt of a user interface event via the user input 76 and the existence of a corresponding one of the pre-computed actions 78 at the client 72. In other words, if the selection element 86 determines that a pre-computed action corresponding to the user input is already received at the client 72, the selection element 86 may communicate with the processor 80 to prompt the processor 80 to execute the corresponding action and may also send an indication to inform the communication element 88. The communication element 88 may be configured to send the notification 89 to the server 72 in response to receipt of the indication from the selection element 86. The notification 89 effectively informs the server 72 of the current state or most recent action performed at the client 70.

The server 72 may include a processing element 90, a pre-computing element 92 and a server side communication element 94. The processing element 90 may control or otherwise perform functions associated with the pre-computing element 92 and/or the server side communication element 94. Processing elements as described herein may be embodied in many ways. For example, the processing element 90 and/or the processor 80 may be embodied as a processor, a coprocessor, a controller or various other processing means or devices including integrated circuits such as, for example, an ASIC (application specific integrated circuit).

The pre-computing element 92 may be any device or means embodied in either hardware, software, or a combination of hardware and software, such as, for example, the processing element 90, that is capable of pre-computing or otherwise determining the pre-computed actions 78. In other words, the pre-computing element 92 may receive a notification of a current state or most recent action performed at the client 70, and may be configured to generate or otherwise determine all or at least a portion of the possible next states or actions which are possible based on the current state of the client 70 or most recent action. In other words, based on the current state of the client 70, the server 72 (e.g., via the pre-computing element 92) may be configured to determine at least a portion of the next states that may be entered by the client 70 from the current state of the client 70. After the pre-computed actions 78 are determined, the pre-computing element 92 may communicate the pre-computed actions 78 to the server side communication element 94, which may be configured to communicate the pre-computed actions 78 to the client 70 via the communication link 74.

The server side communication element 94 may be any device or means embodied in either hardware, software, or a combination of hardware and software, such as a transceiver or other communications interface, that is capable of conducting communications with the client 70, for example, via the communication link 74. In an exemplary embodiment, the server side communication element 94 may be configured to receive the pre-computed actions 78 and communicate the pre-computed actions 78 to the client 70 via the communication link 74. Additionally, the server side communication element 94 may be configured to receive the notification 89 from the client 70. Responsive to receipt of the notification 89, the server side communication element 94 may be configured to send an indication (e.g., via the processing element 90) to the pre-computing element 92 of the current state of the client 70 or most recent action performed at the client 70 to enable the pre-computing element 92 to calculate new pre-computed actions based on the updated current state of the client 70.

Thus, generally speaking, the server 72 may be configured to calculate next possible states (actions) of the client 70 based on the current state (action) of the client 70. The next possible states (e.g., the pre-computed actions 78) may be communicated to the client 70. The client 70 may be configured to receive the user input 76 defining a user input event and determine whether a corresponding pre-computed action has been received. If the corresponding pre-computed action has been received, the client 70 may execute the action and notify the server 72 of the action and/or current state of the client 70 to enable the server 72 to calculate a new set of pre-computed actions corresponding to the current state of the client 70. However, if the corresponding pre-computed action has not been received, the client 70 may communicate the event corresponding to the user input 76 to the server 72 and wait for a response proscribing an action in response to the event.

Figure 4:
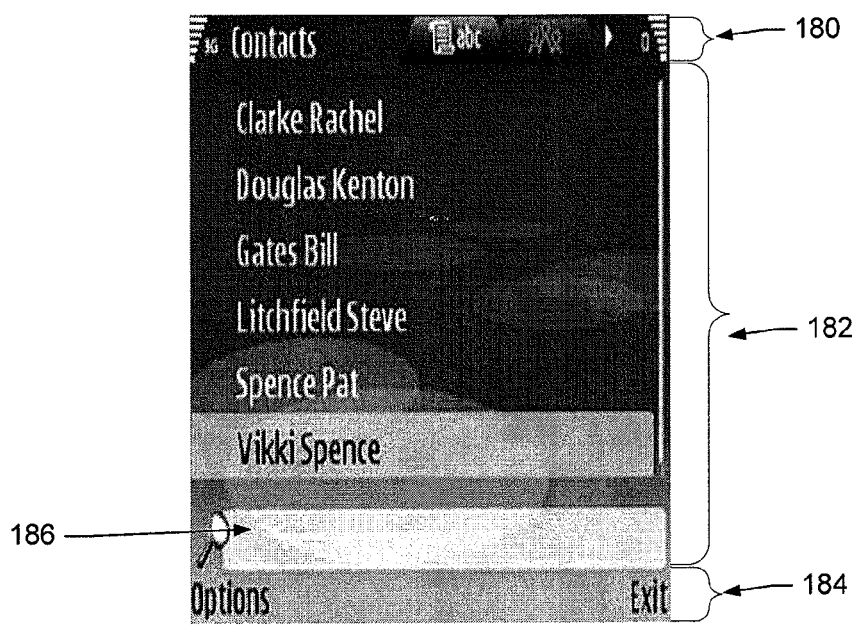
FIG. 4 illustrates an example of a user interface that may be displayed at a client device according to an exemplary embodiment of the present invention.

FIG. 4 illustrates an example of a user interface that may be displayed at a client device. As shown in FIG. 4, the user interface may correspond to a phonebook or contact list application and therefore include a plurality of regions or panes. The panes may include, for example, a status pane 180, a main pane 182, a control pane 184 and/or the like. The status pane 180 may include information elements such as a title, context, navigation information, signal strength indication, etc. The main pane 182 may include a listbox including list data such as a listing of contacts. Selection of an element of the listbox may provide further information (e.g., accessed from the server 72) regarding the corresponding element of the list (e.g., the contact selected). The main pane 182 may also include a search field 186 for entering search parameters. The control pane 184 may include, for example, a command button area and/or a menu bar.

In one exemplary embodiment, the pre-computed actions 78 could include bitmaps or packed bitmaps corresponding to at least some of the possible input events available given the current state of the client 70. Accordingly, if the client 70 is currently displaying the user interface of FIG. 4, the pre-computed actions 78 could include a bitmap corresponding to, for example, any or all of the contacts of the list, any commands or menu items listed, etc. As such, the pre-computed actions 78 could include a simple command to replace the existing user interface (or a portion of the existing user interface) with a corresponding bitmap. For example, the pre-computed actions 78 could include a corresponding bitmap providing contact information for each of the contacts on the list. As such, in response to receipt of the pre-computed actions 78, the memory element 84 may store the pre-computed actions 78 and if the user input 76 is received selecting one of the contacts, the selection element 86 may determine that the corresponding pre-computed action (e.g., a bitmap providing contact information for the selected one of the contacts) is already received and may execute replacement of the existing user interface with at least corresponding portions of the bitmap associated with the selected one of the contacts. The client 70 may then inform the server 72 of the selection made using the notification 89 and may delete the remaining pre-computed actions 78. Upon receipt of the notification 89, the server 72 may calculate a new set of pre-computed actions based on the updated user interface due to the selection of the selected contact.

As an alternative to deleting unselected or unused options from the pre-computed actions 78, the client 70 could continue to store the unused pre-computed actions for a predetermined amount of time, a predetermined number of intervening operations or events, etc. Thus, for example, if the user should back out of a particular operation such that the pre-computed actions 78 for a current state of the client device 70 may be substantially the same as it previously was during one of the preceding operations, the pre-computed actions 78 may not require retransmitting to the client device 70 since they may have been retained at the client device 70. As another alternative, after receiving the notification 89, rather than deleting all previously determined possible client states which were not selected as indicated by the notification 89, the server 72 may store some or all of the previously determined possible client states for a predetermined number of intervening operations, a predetermined amount of time, etc.

Figure 5:
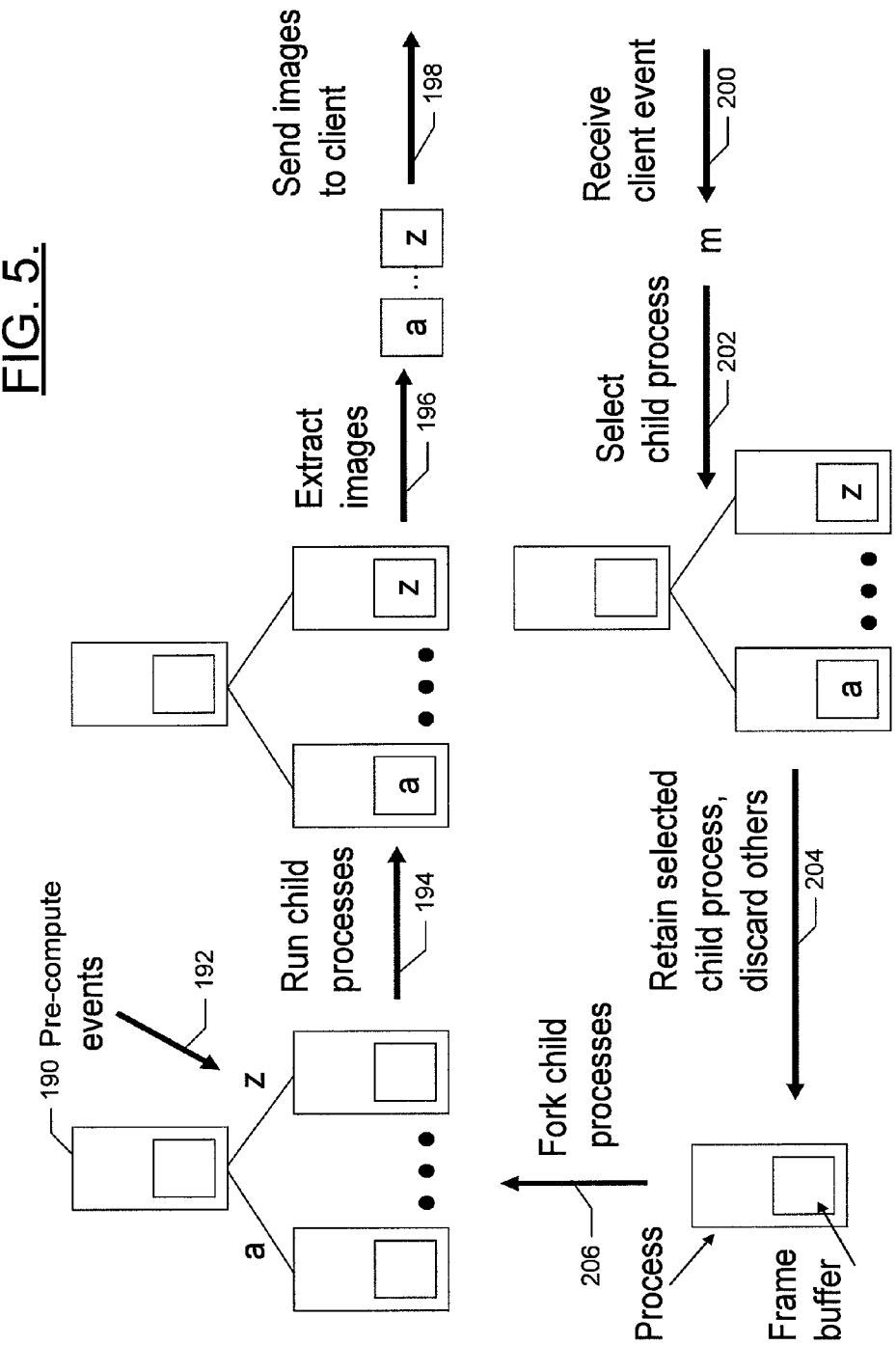
FIG. 5 illustrates an example of step-ahead computing according to an exemplary embodiment of the present invention.

FIG. 5 illustrates an example of the exemplary embodiment described above. In this regard, the server 72 may be aware of an existing user interface 190 of the client 70 (e.g., an existing state of the client device 70). Based on the existing user interface 190, the server 72 may pre-compute possible events a to z at operation 192. The server 72 may then run corresponding child processes a to z at operation 194 and extract corresponding images or bitmaps a to z at operation 196. The images may be sent to the client 70 at operation 198. In response to receipt of a client event 200 (e.g., selection of event m), the server 72 may retain the selected process at operation 202 (e.g., event m) and discard all others at operation 204. The server 72 may then fork the selected process (e.g., establish multiple instances of the same application running from the same point, but operating independent of each other) in order to permit pre-computation of possible events for the current event (e.g., event m) at operation 206. As such, according to the exemplary embodiment of FIG. 5, the server 72 may determine possible next states, which may place the server 72 in a composite state of being in all possible next states at the same time. The server 72 may then determine corresponding user interface updates and, if applicable, preconditions associated with a corresponding input event, which may be communicated to the client 70. When a notification of the event selected according to the user input 76 is received, the server 72 may cancel changes that resulted from entering states not corresponding with the selected event and confirm changes associated with the selected event.

Pre-computation or determination of the pre-computed actions 78 may consume resources of the server 72. As such, pre-computation or determination of the pre-computed actions 78 may be performed during idle time and/or may be performed based on current server resource availability. In other words, for example, the processing element 90 of the server 72 may be configured to monitor resource availability and perform determinations regarding pre-computed actions 78 only when a threshold amount of server resources are available. Accordingly, the server 72 could be configured to perform determinations of pre-computed actions 78 until the threshold amount is reached, at which time the server 72 may stop performing determinations of pre-computed actions 78. Additionally, the server 72 may include a mechanism for performing determinations of pre-computed actions 78 for subscribers having a higher priority or for applications having a higher priority. In this regard, the implementation of priority in performance of determinations of pre-computation actions may be instituted, for example, when a threshold level of resource consumption is reached, when a server administrator provides an instruction, at times of peak activity, etc.

In another exemplary embodiment, instead of the pre-computed actions 78 including bitmaps, the pre-computed actions 78 may be embodied as update actions in the form of scripts. In this regard, instead of moving bitmaps which could be considered space-consuming in certain instances, user interface update actions, which may be provided as the pre-computed actions 78, may be embodied as scripts which can be executed in order to modify user interface objects at the client 70. Since a single script could handle or correspond to multiple similar events (given that the desired processing is similar), and also since scripts may be re-useable, a reduced amount of data traffic between the server 72 and the client 70 may be achieved. In an exemplary embodiment, the client 70 could be comprised of a native Symbian/S60 client application which sees the user interface as a set of user interface objects which may include, for example, menus, views, user interface controls, list controls, text boxes, data objects within the controls, etc. Received user interface update actions may include sequences of update commands (e.g., scripts which operate on the user interface objects).

The client 70 may be, for example, in one of two possible states. In a normal state, the client 70 may be idle and able to immediately respond to an event such as a client user interface event, an action arrival, etc. In a waiting state, the client 70 may be waiting for a server response. Accordingly, the normal state may correspond to a situation in which the client 70 has been provided with pre-computed actions and the waiting state may correspond to a situation in which the client has not been provided with pre-computed actions (or at least not a pre-computed action corresponding to the event received via the client user interface event) and thus sends a message to the server 72 to request an action in response to the event.

In an exemplary embodiment, responses and/or pre-computed actions (e.g., user interface update actions) may each be assigned a unique update action identifier. The update action identifier for each user interface update action may be, for example, a strictly positive number which may sequentially increase with respect to previously issued user interface update actions. As such, the client 70 may be configured to execute user interface update actions in an event-driven fashion where a triggering event could be, for example, an action arrival, a client user interface event, a timer event, and/or the like. Preconditions may also be associated with each user interface update action such that the user interface update action may be executed if the precondition or preconditions are met.

In an exemplary embodiment, the update action identifier of the previous action could be a precondition. In one embodiment, the update action identifier of the previous action could be a mandatory precondition. As such, a current update action identifier may specify a unique action and must be greater than the update action identifier of the previous action in order for the current update action identifier to be executed. Another precondition could be an event filter. In this regard, an event filter may match one or more client events such that the precondition is met whenever the triggering event is a client user interface event and matches the event filter. Yet another possible precondition could be a time filter established to specify a range of client time. The range could be set to any value including infinity. The time filter precondition may be met whenever client time is within the specified range of time.

The client 70 may be capable of storing any number of actions for possible future execution. As such, upon receipt of a triggering event, the client 70 may execute the action corresponding to the triggering event if the preconditions, if any, are satisfied. Thus, for example, in a normal state, upon receipt of a client user interface event, the client 70 may execute a corresponding stored action having all preconditions met and the smallest ID (e.g., if more than one action has all preconditions met). If no stored action exists to correspond to the client user interface event, the client 70 may notify the server 72 of the event and go into the waiting state to await an action in response from the server 72. In the normal state, upon receipt of an event other than a client user interface event or an action arrival (e.g., an action arrival from the server 72 such as server 72 initiated actions), an action not associated with an event filter and having other preconditions satisfied may be executed. In the waiting state, action execution may be triggered only by action arrival from the server 72. The client 70 may execute the first arriving action having an event filter and other preconditions satisfied (e.g., a waited action).

According to the exemplary embodiment above, for any triggering event, more than one action may be executed although only one action associated with an event filter may be executed. When executing multiple actions in response to a singe triggering event, actions may be "chained" according to their update action identifiers and corresponding preconditions. Each executed action is reported to the server 72 via a corresponding notification which may include the update action identifier of the executed action and a timestamp, such as a millisecond-accurate timestamp. Notifications may be sent independently of how an action was triggered and may be encoded in any desirable way. For example, binary or textual (XML) encoding may be utilized. Actions that cannot be executed for any reason (e.g., failure to satisfy preconditions) may be discarded. In one exemplary embodiment in which actions are executed in order of increasing action identifiers, when an action is executed, all actions with a lower update action identifier than the executed action may be discarded.

In an exemplary embodiment, rather than determining a pre-computed action for every possible event associated with the current state of the client 70, the server 72 may be configured to determine only a threshold amount of pre-computed actions. The threshold may be arbitrarily set or determined based on network operating conditions. In one embodiment, the processing element 90 may be configured to access an interaction history of the client 70 and/or of all clients associated with the server 72 in order to determine a probability associated with each possible next input event based on the client's interaction history or the interaction history of other clients or possibly all clients. As such, the processing element 90 may be configured to determine pre-computed actions corresponding to a threshold number of most likely possible next input events. Alternatively or additionally, the processing element 90 may be configured to order the pre-computed actions according to their corresponding probabilities for presentation to the client 70.

FIGS. 6-9 illustrate control flow diagrams corresponding to embodiments of the present invention. In this regard, FIG. 6 is a control flow diagram of an event updating process in which the client 70 has not received a pre-computed action corresponding to the user input 76 according to an exemplary embodiment. As shown in FIG. 6, the client 70 may receive the user input 76 indicative of a user interface event. In response to receipt of the user input 76, which could be a key stroke, a menu item selection, a scroll function or numerous other user interface events, the client 70 may determine whether a pre-computed action corresponding to the user input 76 has already been received at 96. In this example, it is assumed that a corresponding pre-computed action has not been received. Accordingly, the client 70 may communicate an event 98 corresponding to the user input 76 to the server 72. The server 72 may respond to the event 98 by communicating an action 100 corresponding to the event 98 to the client 70. Upon receipt of the action 100 the client 70 may execute the action at 102. The client 70 may then provide a user interface response 104 to the user (e.g., via the user interface element 82) and send a notification 106 to the server 72 to inform the server 72 of the action executed at the client 70. The server 72 (e.g., the pre-computing element 92) may then calculate pre-computed actions 78 based on the notification 106.

FIG. 7 is a control flow diagram of an event updating process in which the client 70 has received a pre-computed action corresponding to the user input 76 according to an exemplary embodiment. As shown in FIG. 7, the client 70 may receive a first set of pre-computed actions 110 based on the current state of the client 70 prior to receipt of the user input. The client 70 may later receive the user input 76 indicative of a user interface event. In response to receipt of the user input 76, the client 70 may determine whether a pre-computed action corresponding to the user input 76 has already been received at 96. In this example, it is assumed that a corresponding pre-computed action has been received among the first set of pre-computed actions 110. Accordingly, the client 70 may execute the corresponding action at operation 112. The client 70 may then provide a user interface response 114 to the user (e.g., via the user interface element 82) and send a notification 116 to the server 72 to inform the server 72 of the action executed at the client device 70. The server 72 (e.g., the pre-computing element 92) may then calculate a second set of pre-computed actions 118 based on the notification 116. It should also be noted that the server 72 may also calculate pre-computed actions beyond a single step ahead. In other words, for the first set of pre-computed actions 110, the server 72 could be configured to calculate a set of pre-computed actions for each possible action within the first set of pre-computed actions. Accordingly, pre-computed actions may be determined for any number of steps beyond the first step ahead.

Figure 8:
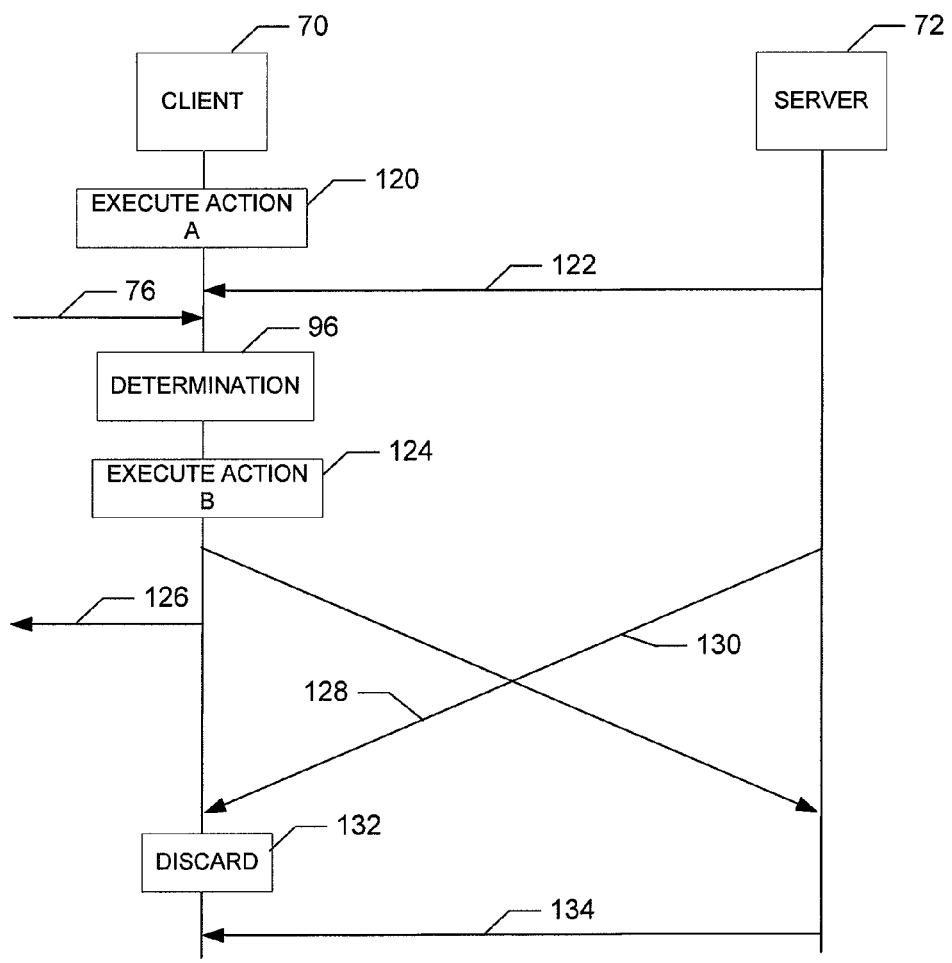
FIG. 8 is a control flow diagram of an event updating process in which conflict resolution is illustrated according to an exemplary embodiment of the present invention.

FIG. 8 is a control flow diagram of an event updating process in which conflict resolution is illustrated according to an exemplary embodiment. As shown in FIG. 8, the client 70 may have executed action A at operation 120 and may have received a set of pre-computed actions 122 corresponding to possible next operations, actions or states based on the execution of action A. The client 70 may then receive the user input 76 indicative of a user interface event directing execution of action B. Assume action B has an associated precondition that action B must follow action A. Thus, in response to receipt of the user input 76, the client 70 may determine whether a pre-computed action corresponding to the user input 76 has already been received at 96 and whether all preconditions are met. In this example, it may be assumed that a corresponding pre-computed action has been received among the set of pre-computed actions 122. Accordingly, the client 70 may execute action B at operation 124. The client 70 may also provide a user interface response 126 to the user (e.g., via the user interface element 82) and send a notification 128 to the server 72 to inform the server 72 of the action executed at the client 70.

However, according to the present embodiment, the server 72 may receive server side changes which may be desired for transmission to the client 70. For example, if the server 70 is an email server, the server 72 may have received a new email message intended for the user of the client 70. Accordingly, the server 72 may desire to communicate, for example, action C as a server initiated event. Action C may have a precondition requiring that action C must follow action A. Accordingly, when an instruction to perform action C 130 is received at the client 70, the client 70 may discard the instruction to perform action C 130 at operation 132, since the precondition that action C must follow action A is not met. Meanwhile, upon receipt of the notification 128, the server 72 may conclude that action C cannot be executed due to the intervening execution of action B. Accordingly, the server 72 may send a modified instruction to perform action C 134 in which the precondition regarding performance of action C may be changed such that the precondition specifies that action C be performed after action B instead of after action A. The client 70 may then execute action C since the precondition for action C is met.

Figure 9:
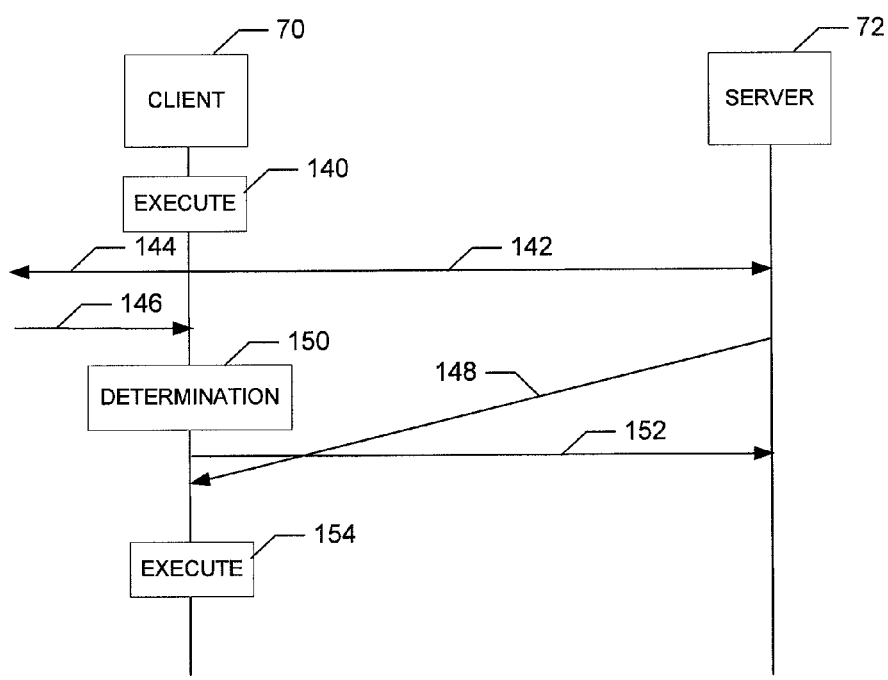
FIG. 9 is a control flow diagram of an event updating process in which the client has received a pre-computed action corresponding to the user input according to an alternative exemplary embodiment of the present invention.

FIG. 9 is a control flow diagram of an event updating process in which the client 70 has received a pre-computed action corresponding to the user input 76 according to an alternative exemplary embodiment. As shown in FIG. 9, the client 70 may have executed a particular action at operation 140 and may communicate a notification 142 to the server 72 and provide a user interface response 144. In response to receipt of the user interface response 144, the user may provide a user input event 146. Meanwhile, in response to receipt of the notification 142, the server 72 may communicate a set of pre-computed actions 148 based on the current state of the client 70. If it is assumed that the user input event 146 is received prior to receipt of the set of pre-computed actions 148, the client 70 may determine that no pre-computed action corresponding to the user input event 146 has already been received at 150. Accordingly, the client 70 may communicate an event 152 corresponding to the user input event 146 to the server 72. If, prior to receipt of an action from the server 72, the client 70 receives the set of pre-computed actions 148, the server 72 (e.g., the selection element 86) may determine that the set of pre-computed actions 148 includes the action corresponding to the user input event 146 and the client 70 may execute the corresponding action at 154.

FIG. 10 illustrates a diagram of server activity (e.g., state transition) according to an exemplary embodiment. In this regard, the server 72 may be assumed to be in an initial state $s_1$, which may have three possible input events $e_1$, $e_2$ and $e_3$. In this example, input event $e_1$ may place the server 72 in state $s_2$, input event $e_2$ may place the server 72 in state $s_3$ and input event $e_3$ may place the server 72 in state $s_4$. According to embodiments of the present invention, when in state $s_1$, the server 72 may enter a composite state of being in all possible next states (e.g., states $s_2$, $s_3$ and $s_4$) at the same time. The server 72 may calculate or otherwise determine corresponding user interface updates (which may have associated preconditions) and may send the corresponding user interface updates to the client 70 as the pre-computed actions 78. Upon receipt of a notification that input event $e_2$ has been selected, the server 72 may change state to state $s_3$ and calculate updated next possible states (e.g., $s_5$, $s_6$ and $s_7$) based on the possible input events (e.g., $e_4$, $e_5$ and $e_6$) for the current state (i.e., $s_3$). In an exemplary embodiment, it may be possible to undue state transitions, for example, by performing a rollback in the case of database operations to arrive at the selected state. In this regard, based on the example above, only state $s_3$ may be committed and states $s_2$ and $s_4$ may be rolled back. Alternatively, a compensation may be performed to destroy objects produced as a side effect of a composite state computation for a state that is not selected.

An exemplary embodiment of the present invention may be implemented in an Atomicity, Consistency, Isolation, and Durability (ACID)-compliant transaction-based model. A basic service interface may support processing an event and returning corresponding UI updates. In order to support parallel step-ahead computing, it may be desirable to encapsulate each event-update sequence within a transaction. For step-ahead computing, a new transaction may be created for each possible event and an update may be computed within each transaction separately. The transactions may be kept open while the pre-computed user interface updates (e.g., pre-computed actions) are sent to the client 70. When the client 70 responds with a confirming notification, all but the confirmed transactions may be rolled back, and only the confirmed transaction may be committed. Accordingly, parallel execution is enabled since transactions may be isolated from each other (e.g., changes in one transaction are not visible to other transactions).

In an exemplary embodiment in which the server 72 enumerates all actions it sends to the client with a unique identifier as described above. Each unique identifier may be used to define server states. As such, at any particular moment, the server 72 may have both a committed state and zero or more pending states. These states form a tree as shown in FIG. 10 in which each root state is the committed state, and each link in the tree may be tagged with a conditional action and an open transaction. Preconditions associated with a particular action must match the tree such that, for example, the previous action constraint is equal to the identifier of the parent node. Update action contents, in turn, may represent modifications to the client user interface due to the pending transaction. Accordingly, it may be understood that a committed state refers to a last action, which has been executed at the client 70, while a pending state refers to a pre-computed future state. The action-transaction links may represent possible event/action paths from the committed state to possible future states.

Initially the server may be in a committed state zero (meaning that no actions have yet been executed) and there may be no pending states. The server 72 may then pre-compute or determine future actions according to possible input events. The server 72 may open a new transaction with a starting state corresponding to the selected node. If the selected node is a root, the server 72 may essentially be opening a new conventional transaction. The server 72 may then execute the event and save the resulting user interface update actions. The pre-computed conditional action (e.g., the pre-computed action) may be sent to the client 70 and a new child node may be added to the tree.

The server 72 may also execute server initiated actions. In such instances, the associated action may be constrained only by previous action identifier constraints. The server 72 may also receive events in the form of a request for a matching action. If there is already a matching action at the root of the state tree, no further action is required since the action is being transferred to the client 70 already. However, if there is no matching action, the server 72 may construct a matching action from the root state as described above.

The server 72 could also receive an action notification. In response to receipt of the action notification, the server 72 may discard all other children of the root (e.g., their associated transactions may be rolled back). The transaction of the performed action may be committed and the corresponding child node may be made the new root. If the server 72 discarded a server-initiated action, the corresponding transaction may be re-executed on the new root.

Figure 11:
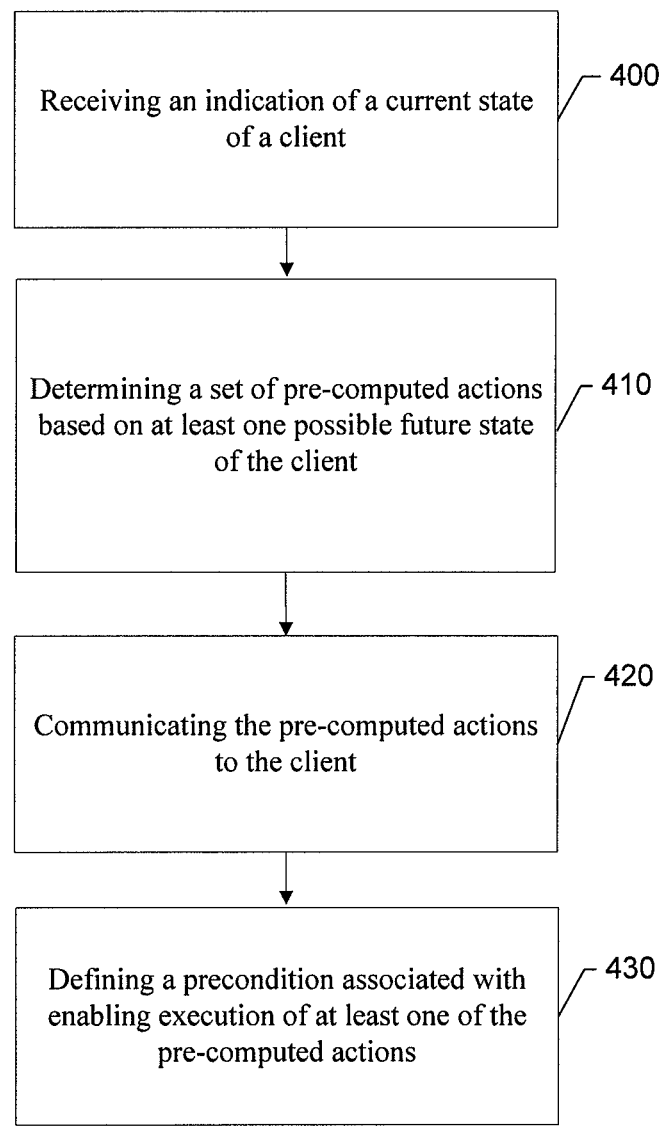
FIG. 11 is a flowchart according to an exemplary method for providing step-ahead computing according to an exemplary embodiment of the present invention.
Figure 12:
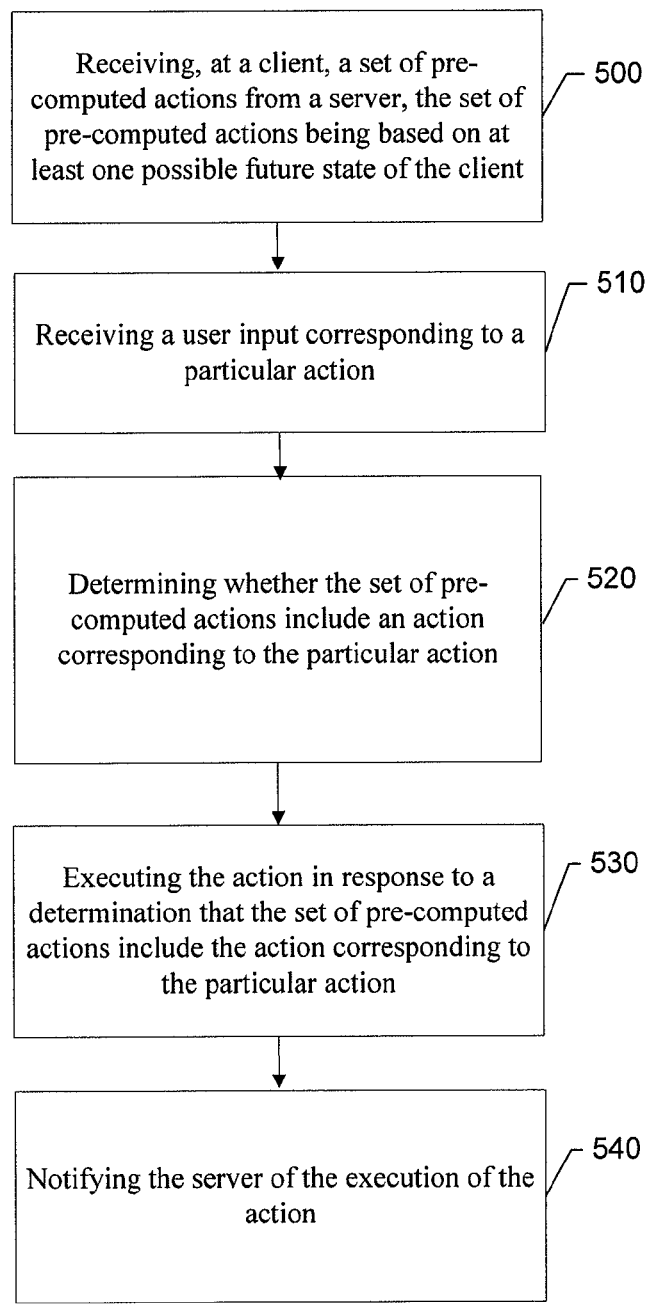
FIG. 12 is a flowchart according to an exemplary method for providing step-ahead computing according to another exemplary embodiment of the present invention.

FIGS. 11 and 12 are flowcharts of a system, methods and program products according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or server and executed by a built-in processor in a mobile terminal or server. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method of providing step-ahead computing as illustrated in FIG. 11 includes receiving an indication of a current state of a client at operation 400. At operation 410, a set of pre-computed actions may be determined based on at least one possible future state of the client. The pre-computed actions may be communicated to the client at operation 420. Operation 420 may include determining a predefined number of most likely possible actions executable by the client based on a personal history of the client or based on a history of all clients associated with the server. Alternatively, operation 420 may include determining each possible action executable by the client from the current state of the client. The pre-computed actions may include, for example, one or more bitmaps associated with a corresponding one or more of the pre-computed actions, or one or more scripts associated with one or more of the pre-computed actions in which each of the scripts has a unique identifier. In an exemplary embodiment, an optional operation 430 may include defining a precondition associated with enabling execution of at least one of the pre-computed actions.

Another embodiment of a method of providing step-ahead computing as illustrated in FIG. 12 includes receiving, at a client, a set of pre-computed actions from a server at operation 500. The set of pre-computed actions may be determined based on at least one possible future state of the client. The pre-computed actions may include, for example, one or more bitmaps associated with a corresponding one or more of the pre-computed actions, or one or more scripts associated with one or more of the pre-computed actions in which each of the scripts has a unique identifier. At operation 510, a user input may be received corresponding to a particular action. A determination may be made regarding whether the set of pre-computed actions include an action corresponding to the particular action at operation 520. At operation 530, the action may be executed in response to a determination that the set of pre-computed actions include the action corresponding to the particular action. In one embodiment, the action may be executed only if a precondition associated with the action is met and pre-computed actions other than the action may be discarded. In an optional operation 540, the server may be notified of the execution of the action.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   receiving an indication of a current state of a client;
   monitoring resource availability of a server;
   determining a set of pre-computed actions based on at least one possible future state of the client and based on the resource availability of the server; and
   communicating the pre-computed actions to the client from the server prior to receiving client selection of an action.

2. A method according to claim 1, wherein determining the set of pre-computed actions comprises determining each possible action executable by the client from the current state of the client.

3. A method according to claim 1, wherein communicating the pre-computed actions to the client comprises communicating one of:
   one or more bitmaps associated with a corresponding one or more of the pre-computed actions; or
   one or more scripts associated with one or more of the pre-computed actions, each of the scripts having a unique identifier.

4. A method according to claim 1, wherein determining the set of pre-computed actions comprises determining a predefined number of most likely possible actions executable by the client based on a personal history of the client.

5. A method according to claim 1, wherein determining the set of pre-computed actions comprises determining a predefined number of most likely possible actions executable by the client based on a history of all clients served by the server.

6. A method according to claim 1, further comprising defining a precondition associated with enabling execution of at least one of the pre-computed actions.

7. A non-transitory computer-readable storage medium carrying one or more sequences of one or more instructions which, when executed by one or more processors, cause an apparatus to at least perform the following steps:
receiving an indication of a current state of a client;
monitoring resource availability of a server;
determining a set of pre-computed actions based on at least one possible future state of the client and based on the resource availability of the server; and
communicating the pre-computed actions to the client from the server prior to receiving client selection of an action.

8. A non-transitory computer-readable storage medium according to claim 7, wherein the determining a set of pre-computed actions includes instructions for determining each possible action executable by the client from the current state of the client.

9. A non-transitory computer-readable storage medium according to claim 7, wherein the communicating the pre-computed actions includes instructions for communicating one of:
one or more bitmaps associated with a corresponding one or more of the pre-computed actions; or
one or more scripts associated with one or more of the pre-computed actions, each of the scripts having a unique identifier.

10. A non-transitory computer-readable storage medium according to claim 7, wherein the determining a set of pre-computed actions includes instructions for determining a pre-defined number of most likely possible actions executable by the client based on a personal history of the client.

11. A non-transitory computer-readable storage medium according to claim 7, wherein the determining a set of pre-computed actions includes instructions for determining a pre-defined number of most likely possible actions executable by the client based on a history of all clients served by the server.

12. A non-transitory computer-readable storage medium according to claim 7, the steps further comprising defining a precondition associated with enabling execution of at least one of the pre-computed actions.

13. An apparatus comprising:
a processor and memory including computer program code, the memory and the computer program code configured to, with the processor, cause the apparatus to:
receive an indication of a current state of a client;
monitor resource availability of a server;
determine a set of pre-computed actions based on at least one possible future state of the client and based on the resource availability of the server; and
communicate the pre-computed actions to the client from the server prior to receiving client selection of an action.

14. An apparatus according to claim 13, wherein the apparatus is further caused to determine each possible action executable by the client from the current state of the client.

15. An apparatus according to claim 13, wherein the apparatus is caused to communicate one of:
one or more bitmaps associated with a corresponding one or more of the pre-computed actions; or
one or more scripts associated with one or more of the pre-computed actions, each of the scripts having a unique identifier.

16. An apparatus according to claim 13, wherein the apparatus is caused to determine a predefined number of most likely possible actions executable by the client based on a personal history of the client.

17. An apparatus according to claim 13, wherein the apparatus is caused to determine a predefined number of most likely possible actions executable by the client based on a history of all clients served by the server.

18. An apparatus according to claim 13, wherein the apparatus is caused to define a precondition associated with enabling execution of at least one of the pre-computed actions.

19. A method comprising:
receiving, at a client, a set of pre-computed actions from a server, the set of pre-computed actions being based on at least one possible future state of the client and based on resource availability of the server;
receiving a user input corresponding to a particular action after receiving the set of pre-computed actions from the server;
determining whether the set of pre-computed actions include an action corresponding to the particular action; and
executing the action in response to a determination that the set of pre-computed actions include the action corresponding to the particular action.

20. A method according to claim 19, wherein executing the action further comprises executing the action only if a precondition associated with the action is met.

21. A method according to claim 19, wherein receiving the set of pre-computed actions comprises receiving one of:
one or more bitmaps associated with a corresponding one or more of the pre-computed actions; or
one or more scripts associated with one or more of the pre-computed actions, each of the scripts having a unique identifier.

22. A method according to claim 19, further comprising discarding ones among the pre-computed actions other than the action.

23. A method according to claim 19, further comprising a fifth executable portion for notifying the server of the execution of the action.

24. A non-transitory computer-readable storage medium carrying one or more sequences of one or more instructions which, when executed by one or more processors, cause an apparatus to at least perform the following steps:
receiving, at a client, a set of pre-computed actions from a server, the set of pre-computed actions being based on at least one possible future state of the client and based on resource availability of the server;
receiving a user input corresponding to a particular action after receiving the set of pre-computed actions from the server;
determining whether the set of pre-computed actions include an action corresponding to the particular action; and
executing the action in response to a determination that the set of pre-computed actions include the action corresponding to the particular action.

25. A non-transitory computer-readable storage medium according to claim 24, wherein the action is executed if a precondition associated with the action is met.

26. A non-transitory computer-readable storage medium according to claim 24, wherein the apparatus is caused, at least in part, to further perform:
receiving one or more bitmaps associated with a corresponding one or more of the pre-computed actions; or
receiving one or more scripts associated with one or more of the pre-computed actions, each of the scripts having a unique identifier.

27. A non-transitory computer-readable storage medium according to claim 24, wherein the apparatus is caused, at least in part, to further perform:

discarding ones among the pre-computed actions other than the action.

28. A non-transitory computer-readable storage medium according to claim 24, wherein the apparatus is caused, at least in part, to further perform:
   notifying the server of the execution of the action.

29. An apparatus comprising:
   a processor and memory including computer program code, the memory and the computer program code configured to, with the processor, cause the apparatus to:
   receive, at a client, a set of pre-computed actions from a server, the set of pre-computed actions being based on at least one possible future state of the client and based on resource availability of the server;
   receive a user input corresponding to a particular action after receiving the set of pre-computed actions from the server;
   determine whether the set of pre-computed actions include an action corresponding to the particular action, and
   execute the action in response to a determination that the set of pre-computed actions include the action corresponding to the particular action.

30. An apparatus according to claim 29, wherein the processing element is further configured to execute the action only if a precondition associated with the action is met.

31. An apparatus according to claim 29, wherein the apparatus is further caused to receive one of:
   one or more bitmaps associated with a corresponding one or more of the pre-computed actions; or
   one or more scripts associated with one or more of the pre-computed actions, each of the scripts having a unique identifier.

32. An apparatus according to claim 29, wherein the apparatus is further caused to discard ones among the pre-computed actions other than the action.

33. An apparatus according to claim 29, wherein the apparatus is further caused to notify the server of the execution of the action.

34. An apparatus according to claim 29, wherein the apparatus is embodied as a mobile terminal.

35. A system comprising:
   a client comprising:
      a communication module configured to receive a set of pre-computed actions, the set of pre-computed actions being based on at least one possible future state of the client;
      a user interface configured to receive a user input corresponding to a particular action; and
      a first processor in communication with the communication module and the user interface and configured to determine whether the set of pre-computed actions include an action corresponding to the particular action and execute the action in response to a determination that the set of pre-computed actions include the action corresponding to the particular action; and
   a server comprising:
      a second processor configured to receive an indication of a current state of the client, and to monitor resource availability of the server;
      a pre-computing module in communication with the second processor and configured to determine the set of pre-computed actions based on the at least one possible future state of the client and based on the resource availability of the server; and
      a server side communication module in communication with the second processor and configured to communicate the pre-computed actions to the client from the server prior to receiving client selection of an action.

* * * * *